United States Patent
Naito et al.

(10) Patent No.: US 9,393,524 B2
(45) Date of Patent: Jul. 19, 2016

(54) ENGINE EXHAUST TREATMENT DEVICE

(75) Inventors: Keita Naito, Sakai (JP); Toshio Nakahira, Sakai (JP); Yoshikazu Takemoto, Sakai (JP); Takashi Onishi, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 341 days.

(21) Appl. No.: 14/002,597

(22) PCT Filed: Jan. 26, 2012

(86) PCT No.: PCT/JP2012/051607
§ 371 (c)(1),
(2), (4) Date: Aug. 30, 2013

(87) PCT Pub. No.: WO2012/120935
PCT Pub. Date: Sep. 13, 2012

(65) Prior Publication Data
US 2013/0336843 A1    Dec. 19, 2013

(30) Foreign Application Priority Data

Mar. 9, 2011  (JP) ................................. 2011-052145

(51) Int. Cl.
*F01N 3/00* (2006.01)
*B01D 53/94* (2006.01)
(Continued)

(52) U.S. Cl.
CPC ............ *B01D 53/9495* (2013.01); *F01N 3/025* (2013.01); *F01N 3/0256* (2013.01); *F01N 3/323* (2013.01); *F01N 3/36* (2013.01); *F01N 2240/14* (2013.01)

(58) Field of Classification Search
USPC ................... 60/286, 289, 295, 297, 303, 311
See application file for complete search history.

(56) References Cited

U.S. PATENT DOCUMENTS 5,771,683 A    6/1998  Webb
7,908,847 B2 *  3/2011  Crawley .................. F01N 3/025
                                                       431/12

(Continued)

FOREIGN PATENT DOCUMENTS

DE    3808075 A1    9/1989
EP    2025890 A1    2/2009

(Continued)

OTHER PUBLICATIONS

Int'l Search Report issued May 1, 2012 in Int'l Application No. PCT/JP2012/051607.

(Continued)

*Primary Examiner* — Binh Q Tran
(74) *Attorney, Agent, or Firm* — Panitch Schwarze Belisario & Nadel LLP (57) ABSTRACT

An engine exhaust treatment device is capable of combusting PM accumulated in a DPF or activating an exhaust purification catalyst even immediately after engine startup or at the time of light load operation. A combustible gas supply passage (8) communicates with an exhaust passage (4) on an upstream of a combustion catalyst (5). An air supply unit (9) and an ignition unit (10) are provided in this supply passage and interlocked with a control unit (11). Where a temperature of the exhaust is lower than a predetermined temperature, the control unit supplies air (12) to a combustible gas by the air supply unit (9) and causes ignition of the combustible gas by the ignition unit (10), so as to cause flame combustion of the combustible gas. The temperature of the exhaust (6) in the exhaust passage (4) is increased by heat of this flame combustion.

6 Claims, 9 Drawing Sheets

(51) Int. Cl.
*F01N 3/025* (2006.01)
*F01N 3/32* (2006.01)
*F01N 3/36* (2006.01)

(56) References Cited

U.S. PATENT DOCUMENTS

| | | | | |
|---|---|---|---|---|
| 8,353,153 B2* | 1/2013 | Kotrba | ............... | F01N 3/0238 60/286 |
| 8,407,989 B2* | 4/2013 | Leustek | ............... | 60/274 |
| 8,438,838 B2* | 5/2013 | Khadiya | ............... | F01N 3/035 60/274 |
| 8,464,516 B2* | 6/2013 | Bell | ............... | F01N 3/025 60/286 |
| 9,027,331 B2* | 5/2015 | Olivier | ............... | F01N 3/106 431/166 |
| 2009/0044522 A1 | 2/2009 | Nakahira et al. | | |
| 2009/0180937 A1* | 7/2009 | Nohl | ............... | F01N 3/025 422/176 |
| 2009/0285724 A1 | 11/2009 | Nakahira | | |

FOREIGN PATENT DOCUMENTS

| | | |
|---|---|---|
| EP | 2119881 A2 | 11/2009 |
| EP | 2474715 A1 | 7/2012 |
| JP | H02-107717 U | 8/1990 |
| JP | 2007-071034 A | 3/2007 |
| JP | 2009-074533 A | 4/2009 |
| JP | 2009-299677 A | 12/2009 |

OTHER PUBLICATIONS

Extended European Search Report issued Aug. 8, 2014 in EP Application No. 12755057.2.
Examination Report issued May 2, 2016 in EP Application No. 12755057.2.

* cited by examiner

ENGINE EXHAUST TREATMENT DEVICE

CROSS-REFERENCE TO RELATED APPLICATIONS

This application is a Section 371 of International Application No. PCT/JP2012/051607, filed Jan. 26, 2012, which was published in the Japanese language on Sep. 13, 2012, under International Publication No. WO 2012/120935 A1 and the disclosure of which is incorporated herein by reference.

BACKGROUND OF THE INVENTION

1. Technical Field

The present invention relates to an engine exhaust treatment device, and in detail, relates to an engine exhaust treatment device capable of combusting PM accumulated in a DPF or activating an exhaust purification catalyst even immediately after engine startup or at the time of light load operation.

2. Background Art

Conventionally, there has been an engine exhaust treatment device for generating a combustible gas by a combustible gas generator, emitting this combustible gas to an exhaust passage from a combustible gas emission port, catalyst-combusting this combustible gas by a combustion catalyst, increasing a temperature of an exhaust by heat of the catalyst combustion, and combusting and removing PM accumulated in a DPF which is arranged on a downstream of the combustion catalyst, or activating an exhaust purification catalyst arranged on a downstream of the combustion catalyst, for example, refer to Japanese Patent Laid-open Publication No. 2007-71034 (refer to FIG. 1).

According to this type of exhaust treatment device, there is an advantage that even in a case where the temperature of the exhaust is relatively low, the temperature of the exhaust can be increased with the combustible gas by the catalyst-combustion.

However, this conventional technique does not include a combustion unit of the combustible gas other than the combustion catalyst, so that there is a problem.

BRIEF SUMMARY OF THE INVENTION

Problems to be Solved by the Invention

Immediately after engine startup or at the time of light load operation, the PM accumulated in the DPF cannot be combusted or the exhaust purification catalyst cannot be activated.

No combustion unit of the combustible gas other than the combustion catalyst is provided. Thus, in a case where the temperature of the exhaust does not reach an activation temperature of the combustion catalyst, for example, immediately after engine startup or at the time of light load operation, the heat of the catalyst combustion of the combustion catalyst cannot be obtained, so that the PM accumulated in the DPF cannot be combusted or the exhaust purification catalyst cannot be activated.

An object of the present invention is to provide an engine exhaust treatment device capable of combusting PM accumulated in a DPF or activating an exhaust purification catalyst even immediately after engine startup or at the time of light load operation.

Solutions to the Problems

A particular matter of the invention according to a first aspect is as follows.

Figure 2:
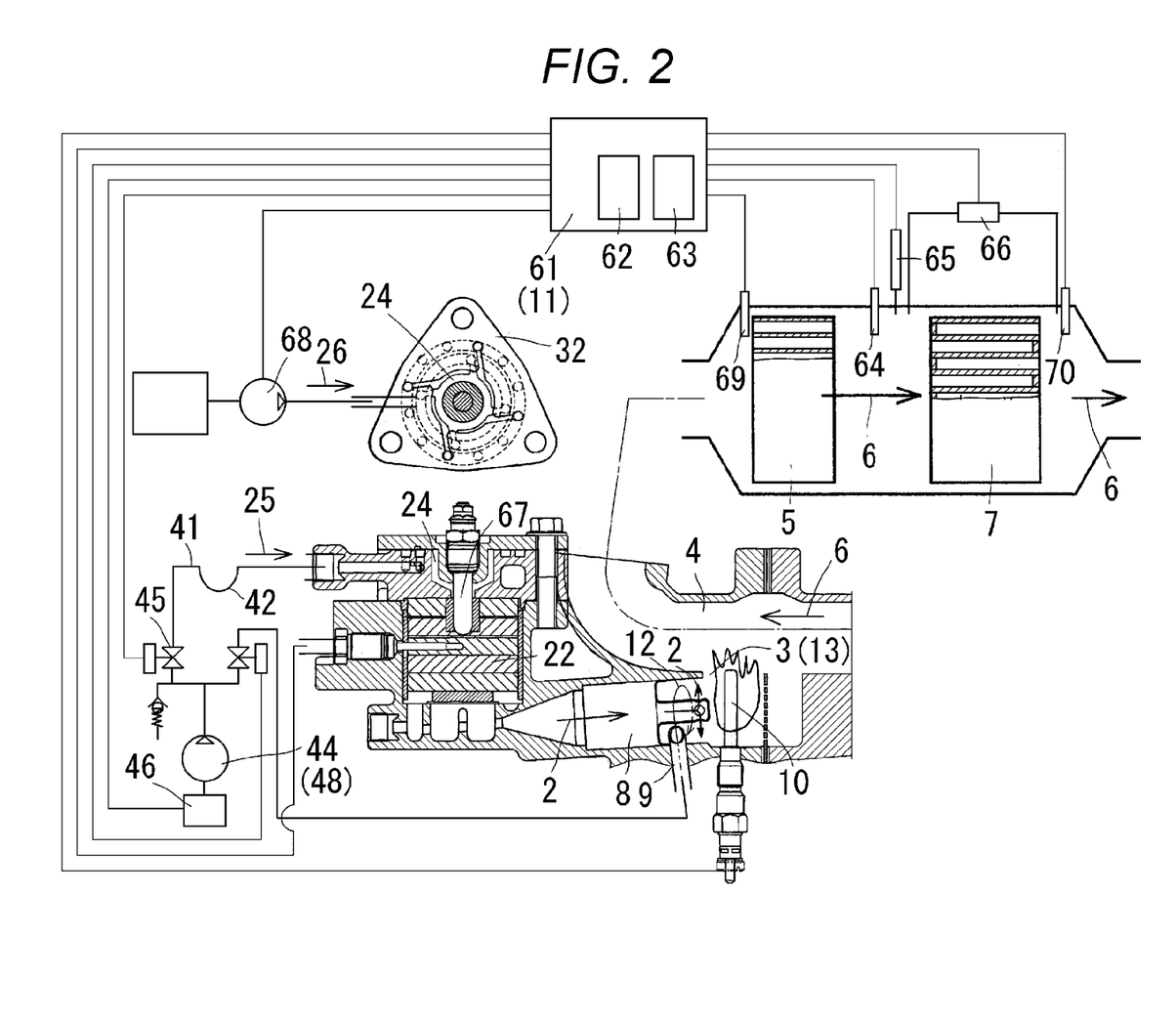
FIG. 2 is a schematic view of the exhaust treatment device of FIGS. 1(A) to 1(C) and circumferential parts thereof.
Figure 3:
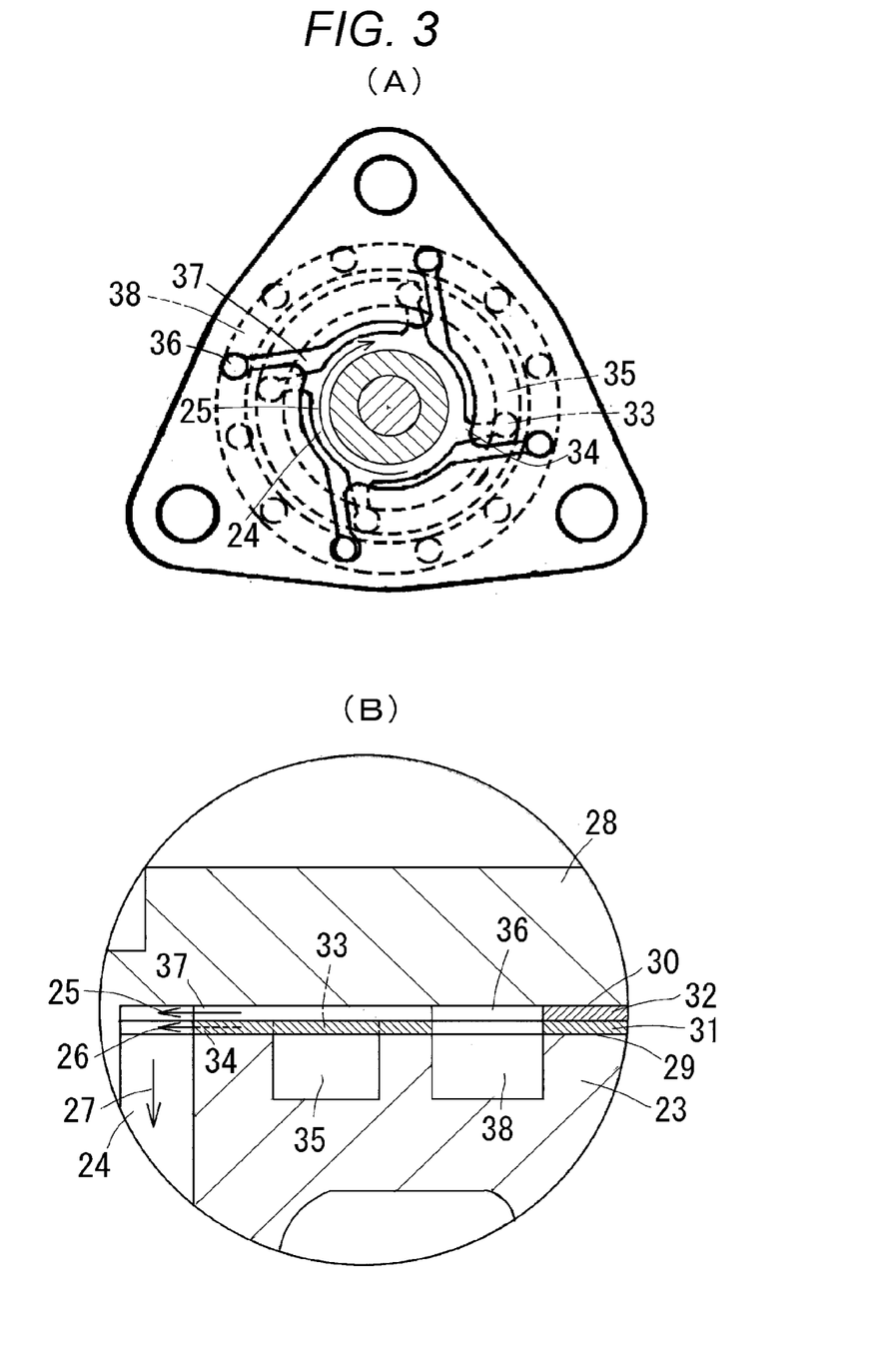
FIG. 3(A) is a plan view in which double gaskets of a basic example used in the exhaust treatment device of FIGS. 1(A) to 1(C) are mounted on a lid mount surface.
FIG. 3(B) is an enlarged view of a IIIB part of FIG. 1(A)
Figure 4:
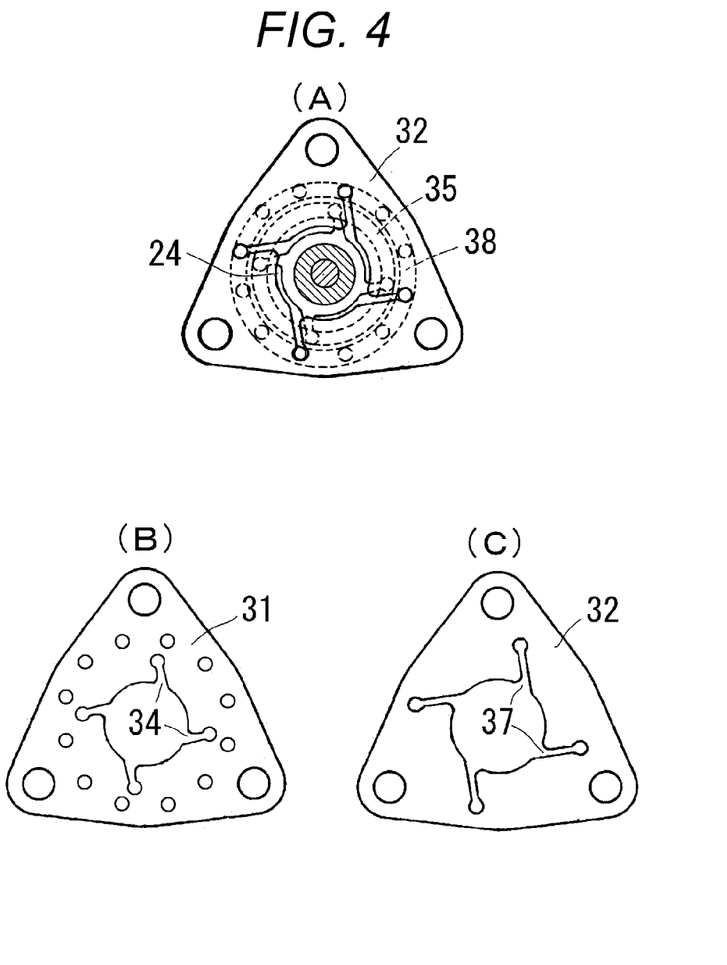
FIG. 4(A) is a reduced view of FIG. 3(A)
FIG. 4(B) is a plan view of the lower gasket provided with liquid fuel outlets.
FIG. 4(C) is a plan view of the upper gasket provided with air outlets.
Figure 5:
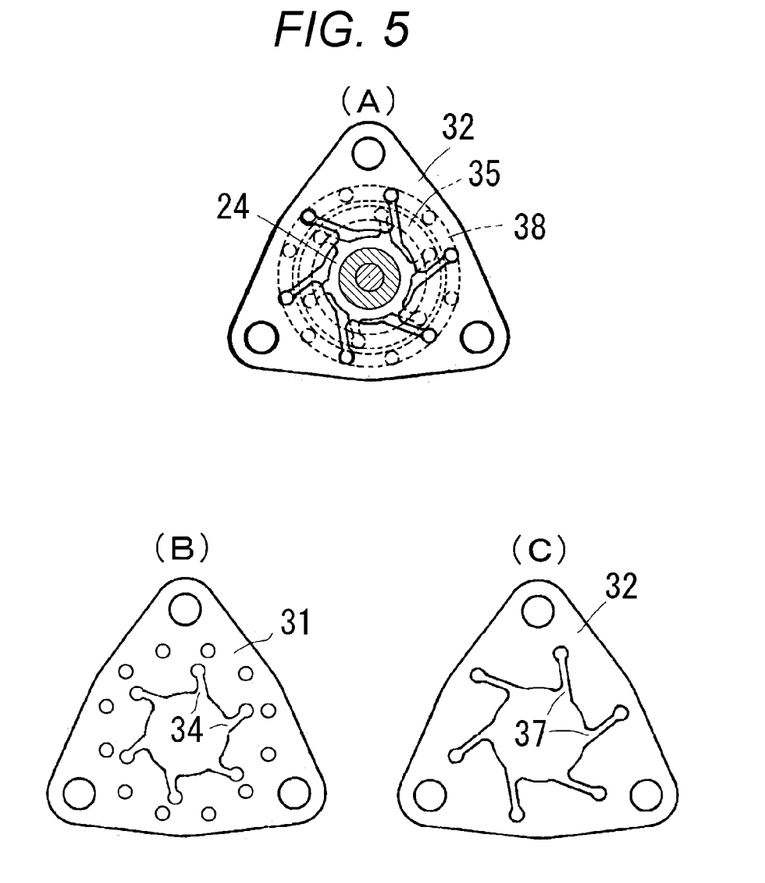
FIG. 5(A) is a view corresponding to FIG. 3(A)
FIG. 5(B) is a view corresponding to FIG. 3(B)
FIG. 5(C) is a view corresponding to FIG. 3(C)
Figure 6:
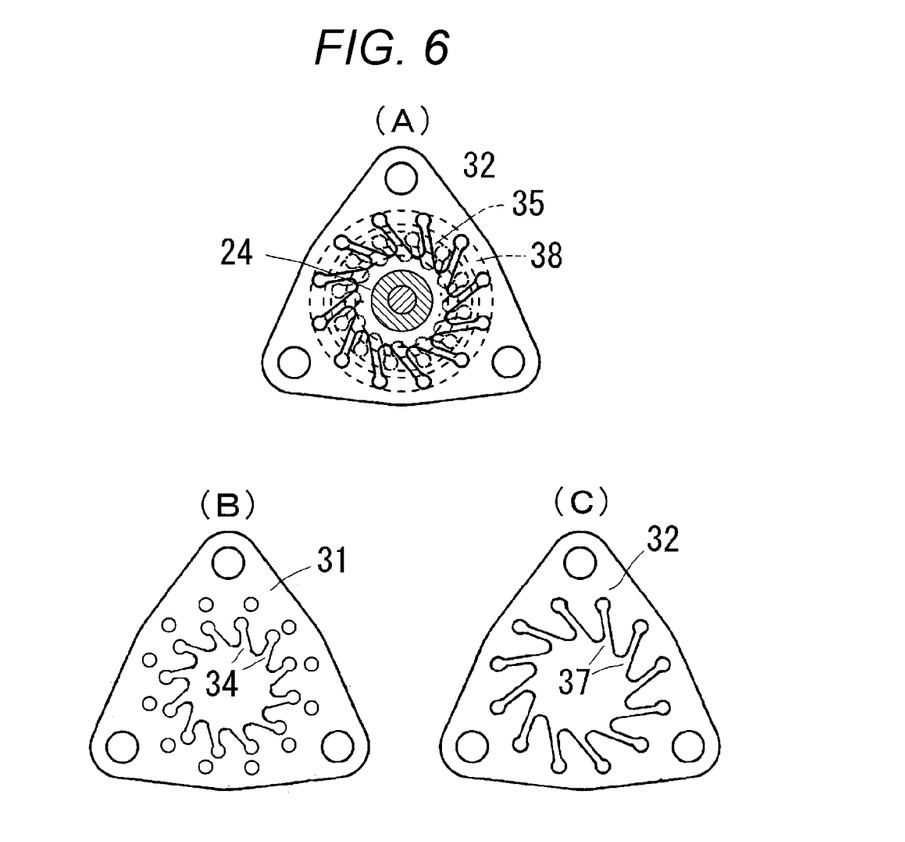
FIG. 6(A) is a view corresponding to FIG. 3(A)
FIG. 6(B) is a view corresponding to FIG. 3(B)
FIG. 6(C) is a view corresponding to FIG. 3(C)
Figure 7:
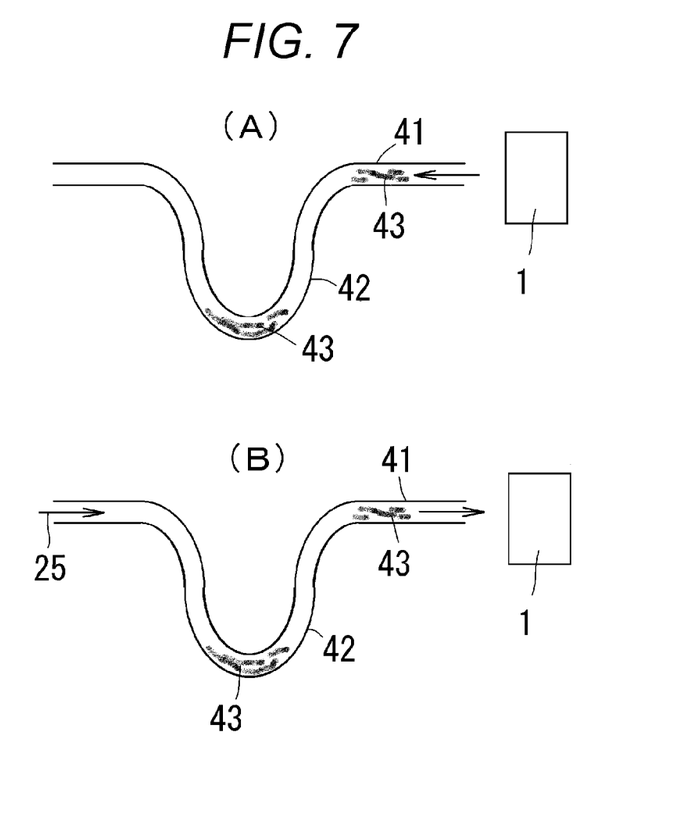
FIG. 7(A) shows a state that contaminants are accumulated.
FIG. 7(B) shows a state that the contaminants are purged.

FIG. 2 shows an engine exhaust treatment device for generating a combustible gas (2) by a combustible gas generator (1), emitting the combustible gas (2) to an exhaust passage (4) from a combustible gas emission port (3), catalyst-combusting the combustible gas (2) by a combustion catalyst (5), increasing a temperature of an exhaust (6) by heat of the catalyst combustion, and combusting and removing PM accumulated in a DPF (7) which is arranged on a downstream of the combustion catalyst (5), or activating an exhaust purification catalyst arranged on a downstream of the combustion catalyst (5).

As shown in FIG. 2, a combustible gas supply passage (8) communicates with the exhaust passage (4) on an upstream of the combustion catalyst (5), an air supply unit (9) and an ignition unit (10) are provided in the combustible gas supply passage (8), the air supply unit (9) and the ignition unit (10) are interlocked with a control unit (11).

As shown in FIG. 2, in a case where the temperature of the exhaust is lower than a predetermined temperature, the control unit (11) supplies air (12) to the combustible gas (2) by the air supply unit (9) and causes ignition of the combustible gas (2) by the ignition unit (10) so as to cause flame combustion of the combustible gas (2), and the temperature of the exhaust (6) in the exhaust passage (4) is increased by heat of the flame combustion.

Effects of the Invention

The invention according to a first aspect exerts the following effect. Even immediately after engine startup or at the time of light load operation, the PM accumulated in the DPF can be combusted or the exhaust purification catalyst can be activated.

As shown in FIG. 2, in a case where the temperature of the exhaust is lower than a predetermined temperature, the control unit (11) supplies the air (12) to the combustible gas (2) by the air supply unit (9) and causes the ignition of the combustible gas (2) by the ignition unit (10) so as to cause flame combustion of the combustible gas (2), and the temperature of the exhaust (6) in the exhaust passage (4) is increased by heat of the flame combustion. Thus, even in a case where the temperature of the exhaust does not essentially reach an activation temperature of the combustion catalyst (5), for example, immediately after engine startup or at the time of light load operation, the temperature of the exhaust (6) can be increased by the heat of the flame combustion of the combustible gas (2), so that the temperature of the exhaust can reach the activation temperature of the combustion catalyst (5). Therefore, even immediately after engine startup or at the time of light load operation, the PM accumulated in the DPF (7) can be combusted or the exhaust purification catalyst can be activated.

The invention according to a second aspect exerts the following effect in addition to the effect according to the first aspect.

Figure 1:
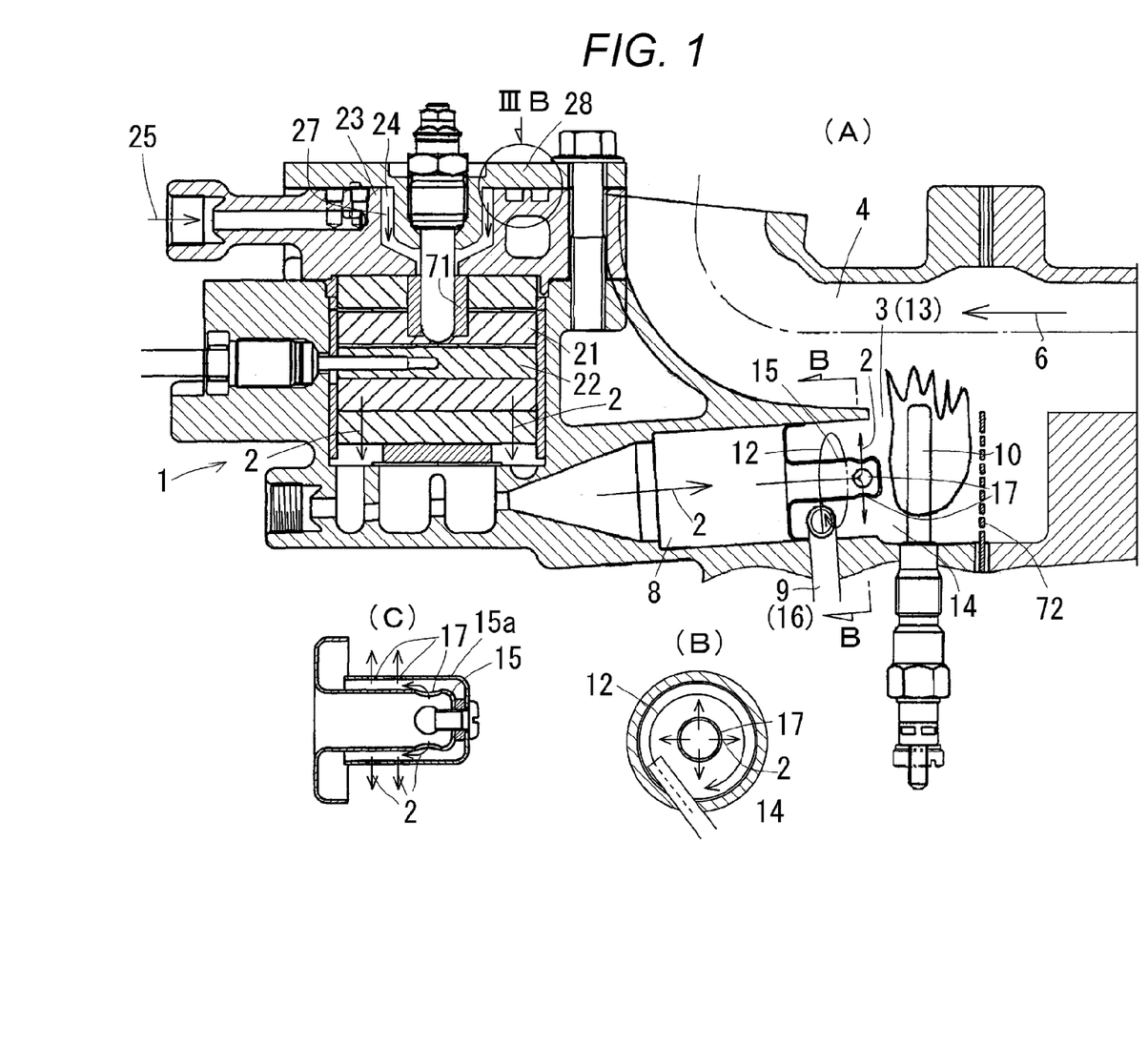
FIG. 1(A) is a vertically sectional view of the exhaust treatment device.
FIG. 1(B) is a sectional view by line B-B of FIG. 1(A)
FIG. 1(C) is a vertically sectional view of a modified example of a combustible gas nozzle.

An exhaust pressure is not boosted. As shown in FIG. 1(A), the exhaust passage (4) and the combustible gas supply passage (8) are provided side by side, a heat emission port (13) is formed on a border between the exhaust passage (4) and the combustible gas supply passage (8) on a downstream side of the combustible gas supply passage (8), the heat emission port (13) provides communication between the exhaust passage (4) and the combustible gas supply passage (8), and the ignition unit (10) arranged on the downstream side of the combustible gas supply passage (8) faces the heat emission port (13). Thus, a flow of the exhaust (6) of the exhaust passage (4) is not disturbed by the combustible gas supply passage (8) and the ignition unit (10), so that the exhaust pressure is not boosted.

Temperature increase efficiency of the exhaust is high. As shown in FIG. 1(A), the ignition unit (10) arranged on the downstream side of the combustible gas supply passage (8) faces the heat emission port (13). Thus, the temperature of the exhaust (6) is directly increased by combustion flame of the combustible gas (2), so that the temperature increase efficiency of the exhaust (6) is high.

The invention according to a third aspect exerts the following effect in addition to the effect according to the second aspect. The temperature increase efficiency of the exhaust is more enhanced.

As shown in FIG. 1(A), the combustible gas supply passage (8) is provided side by side on the lower side of the exhaust passage (4), and the heat emission port (13) is formed on the lower side of a circumferential surface of the exhaust passage (4). Thus, heat wave of the combustion flame of the combustible gas (2) floats up to the exhaust passage (4), and the temperature of the exhaust (6) of the exhaust passage (4) is increased, so that the temperature increase efficiency of the exhaust (6) is more enhanced.

The invention according to a fourth aspect exerts the following effect in addition to the effects according to the first to the third aspects. A high heat emission amount is obtained.

As shown in FIG. 1(B), the combustible gas (2) supplied in a radial direction of a mixing chamber (14) from combustible gas outlets (17) is mixed with the whirled air (12). Thus, a mixing property between the combustible gas (2) and the air (12) is favorable, so that a high heat emission amount is obtained by the ignition of the combustible gas (2).

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 1(A) to 1(C) are views for illustrating a diesel engine exhaust treatment device according to an embodiment of the present invention.

FIGS. 5(A) to 5(C) are views for illustrating a first modified example of the double gaskets.

FIGS. 6(A) to 6(C) are views for illustrating a second modified example of the double gaskets.

FIGS. 7(A) and 7(B) are views for illustrating a U tube provided in an air supply passage of the exhaust treatment device of FIGS. 1(A) to 1(C)

FIGS. 8(A) and 8(B) are illustrative views of an Oldham coupling for connecting an output shaft of a motor and an input shaft of an exhaust blower to be used in the exhaust treatment device of FIGS. 1(A) to 1(C)

DETAILED DESCRIPTION OF THE INVENTION

Embodiments of the Invention

FIGS. 1(A) to 9 are views for illustrating an engine exhaust treatment device according to an embodiment of the present invention. In the embodiment, a diesel engine exhaust treatment device will be described.

As shown in FIG. 2, a combustible gas (2) is generated by a combustible gas generator (1), this combustible gas (2) is emitted to an exhaust passage (4) from a combustible gas emission port (3), this combustible gas (2) is catalyst-combusted by a combustion catalyst (5), a temperature of an exhaust (6) is increased by heat of the catalyst combustion, and PM accumulated in a DPF (7) which is arranged on a downstream of the combustion catalyst (5) is combusted and removed.

DPF is an abbreviation for a diesel particulate filter. PM is an abbreviation for particulate matter.

This combustion catalyst (5) is a DOC. DOC is an abbreviation for a diesel oxidation catalyst. Together with PM removal of the DPF (7) or instead of the PM removal of the DPF (7), an exhaust purification catalyst (such as a SCR catalyst and a $NO_x$ absorber catalyst) arranged on the downstream of the combustion catalyst (5) may be activated. The SCR catalyst is an abbreviation of a selective catalytic reduction catalyst.

As shown in FIG. 2, a combustible gas supply passage (8) communicates with the exhaust passage (4) on an upstream of the combustion catalyst (5), an air supply unit (9) and an ignition unit (10) are provided in this combustible gas supply passage (8), and this air supply unit (9) and the ignition unit (10) are interlocked with a control unit (11). The ignition unit (10) is a glow plug. The reference sign (72) in the drawings denotes a flame holding screen made by forming a large number of holes in a plate material, for suppressing extinction of combustion flame by the exhaust (6).

As shown in FIG. 2, in a case where the temperature of the exhaust is lower than a predetermined temperature, the control unit (11) supplies the air (12) to the combustible gas (2) by the air supply unit (9) and causes ignition of the combustible gas (2) by the ignition unit (10) so as to cause flame combustion of the combustible gas (2), and the temperature of the exhaust (6) in the exhaust passage (4) is increased by heat of this flame combustion.

Thereby, even in a case where the temperature of the exhaust does not essentially reach an activation temperature of the combustion catalyst (5), for example, immediately after engine startup or at the time of light load operation, the temperature of the exhaust (6) can be increased by the heat of the flame combustion of the combustible gas (2), so that the temperature of the exhaust can reach the activation temperature of the combustion catalyst (5). Therefore, even immediately after engine startup or at the time of light load operation, the PM accumulated in the DPF (7) can be combusted or the exhaust purification catalyst can be activated.

As shown in FIG. 1(A), the exhaust passage (4) and the combustible gas supply passage (8) are provided side by side, a heat emission port (13) is formed on a border between the exhaust passage (4) and the combustible gas supply passage (8) on a downstream side of the combustible gas supply passage (8), this heat emission port (13) provides communication between the exhaust passage (4) and the combustible gas supply passage (8), and the ignition unit (10) arranged on the downstream side of the combustible gas supply passage (8) faces this heat emission port (13).

Thereby, a flow of the exhaust (6) of the exhaust passage (4) is not disturbed by the combustible gas supply passage (8) and the ignition unit (10), so that the exhaust pressure is not boosted. The temperature of the exhaust (6) is directly increased by the combustion flame of the combustible gas (2), so that temperature increase efficiency of the exhaust (6) is high.

As shown in FIG. 1(A), the combustible gas supply passage (8) is provided side by side on the lower side of the exhaust passage (4), and the heat emission port (13) is formed on the lower side of a circumferential surface of the exhaust passage (4). Thereby, the heat wave of the combustion flame of the combustible gas (2) floats up to the exhaust passage (4), and the temperature of the exhaust (6) of the exhaust passage (4) is increased, so that the temperature increase efficiency of the exhaust (6) is more enhanced.

As shown in FIGS. 1(A) and 1(B), a mixing chamber (14) for the combustible gas (2) and the air (12) is formed along the combustible gas supply passage (8) on an upstream of the ignition unit (10), a combustible gas nozzle (15) and an air supply tube (16) are provided in this mixing chamber (14), the combustible gas nozzle (15) is arranged in a center part of the mixing chamber (14) along a forming direction of the mixing chamber (14), a plurality of combustible gas outlets (17) is formed on a circumferential surface of this combustible gas nozzle (15), the air supply tube (16) is arranged in an inner circumferential surface part of the mixing chamber (14) along a circumferential direction of an inner circumferential surface of the mixing chamber (14), and the air (12) supplied from the air supply tube (16) is whirled round the combustible gas nozzle (15) along the inner circumferential surface of the mixing chamber (14).

The combustible gas (2) supplied in a radial direction of the mixing chamber (14) from the combustible gas outlets (17) is mixed with this whirled air (12). Thereby, a mixing property between the combustible gas (2) and the air (12) is favorable, so that a high heat emission amount is obtained by the ignition of the combustible gas (2).

It should be noted that as shown in FIG. 1(C), the combustible gas nozzle (15) may be covered with a cap (15a), combustible gas outlets (17) may also be formed on a circumferential wall of this cap (15a) in a circumferential direction, and the combustible gas (2) flowing into the cap (15a) from the combustible gas nozzle (15) may be supplied in a radial direction of the mixing chamber (14) from the combustible gas outlets (17) of the cap (15a).

As shown in FIG. 2, upon supplying liquid fuel (26) and the air (25) to the combustible gas generator (1) so as to generate the combustible gas (2) by a combustible gas generation catalyst (22), in a case where a temperature of the combustible gas generation catalyst (22) is lower than a predetermined temperature, the control unit (11) supplies the air (25) to the combustible gas (2) by the air supply unit (9) and causes the ignition of the combustible gas (2) by the ignition unit (10) so as to cause the flame combustion of the combustible gas (2), and a liquid component flowing out from the combustible gas generator (1) is gasified by the heat of this flame combustion. Thereby, the liquid component flowing out from the combustible gas generator (1) is not attached to an interior of the exhaust passage (4), so that generation of white smoke can be prevented at the time of engine startup.

As shown in FIG. 1(A), by providing a combustible gas generation catalyst chamber (21) in the combustible gas generator (1), accommodating the combustible gas generation catalyst (22) in this combustible gas generation catalyst chamber (21), arranging an annular wall (23) in a starting end of the combustible gas generation catalyst chamber (21), forming an air-fuel mixing chamber (24) inside this annular wall (23), and supplying the air (25) and the liquid fuel (26) to this air-fuel mixing chamber (24), an air-fuel mixing gas (27) is formed in the air-fuel mixing chamber (24), and upon supplying this air-fuel mixing gas (27) to the combustible gas generation catalyst (22) so as to generate the combustible gas (2) by the combustible gas generation catalyst (22), the following procedure is taken.

As shown in FIG. 3(B), a lid (28) is arranged in a starting end of the annular wall (23), an annular lid mount surface (29) is provided in the starting end of the annular wall (23), a mounted surface (30) is provided in the lid (28), and the mounted surface (30) of the lid (28) is mounted and fixed to the lid mount surface (29) of the annular wall (23) via annular gaskets (31) (32).

As shown in FIG. 3(A), a plurality of liquid fuel inlets (33) and a plurality of liquid fuel outlets (34) are provided in the gasket (31) at predetermined intervals in the circumferential direction, and the liquid fuel outlets (34) derive from the liquid fuel inlets (33) toward the inside of the gasket (31).

As shown in FIG. 3(B), on any surface of the lid mount surface (29) of the annular wall (23) and the mounted surface (30) of the lid (28), a liquid fuel guide groove (35) along the circumferential direction is recessed, the liquid fuel inlets (33) communicate with an opening of this liquid fuel guide groove (35), the liquid fuel (26) supplied to the liquid fuel guide groove (35) flows out to the air-fuel mixing chamber (24) from the liquid fuel outlets (34) via the liquid fuel inlets (33).

Thereby, in comparison to a case where a liquid fuel guide passage and liquid fuel outlets are formed in the annular wall (23), processing of the annular wall (23) can be easily performed.

As shown in FIG. 3(A), upon whirling the air (25) in the air-fuel mixing chamber (24), the liquid fuel outlets (34) are directed to a downstream side in an air whirling direction of the air-fuel mixing chamber (24). Thereby, the air (25) and the liquid fuel (26) are uniformly mixed in the air-fuel mixing chamber (24).

As shown in FIG. 3(A), a plurality of air inlets (36) and a plurality of air outlets (37) are provided in the gasket (32) at predetermined intervals in the circumferential direction, the air outlets (37) derive from the air inlets (36) toward the inside of the gasket (32). As shown in FIG. 3(B), on any surface of the lid mount surface (29) of the annular wall (23) and the mounted surface (30) of the lid (28), an air guide groove (38)

along the circumferential direction is recessed, the air inlets (36) communicate with an opening of this air guide groove (38), and the air (25) supplied to the air guide groove (38) flows out to the air-fuel mixing chamber (24) from the air outlets (37) via the air inlets (36).

Thereby, in comparison to a case where an air guide passage and air outlets are formed in the annular wall (23), the processing of the annular wall (23) can be easily performed.

As shown in FIG. 3(A), upon whirling the air (25) in the air-fuel mixing chamber (24), the air outlets (37) are directed to the downstream side in the air whirling direction of the air-fuel mixing chamber (24). Thereby, the air (25) can be easily whirled in the air-fuel mixing chamber (24).

In a basic example shown in FIG. 4(B), four liquid fuel outlets (34) are arranged in the gasket (31) at fixed intervals in the circumferential direction.

In a first modified example shown in FIG. 5(B), six liquid fuel outlets (34) are arranged in the gasket (31) at fixed intervals in the circumferential direction.

In a second modified example shown in FIG. 6(B), twelve liquid fuel outlets (34) are arranged in the gasket (31) at fixed intervals in the circumferential direction.

As shown in FIG. 6(B), when the gasket (31) is provided with twelve liquid fuel outlets (34), at the time of inclination of the combustible gas generator (1), total opening area of six liquid fuel outlets (34) on the inclination lower side is relatively large. Thus, all the necessary liquid fuel (26) is supplied from the liquid fuel outlets (34) on the inclination lower side, and no liquid fuel (26) is supplied from the liquid fuel outlets (34) on the inclination upper side. Therefore, distribution of the liquid fuel (24) in the air-fuel mixing chamber (24) becomes uneven, and the entire combustible gas generation catalyst (22) cannot be effectively utilized, so that generation efficiency of the combustible gas (2) is lowered.

Meanwhile, as shown in FIG. 5(B), in a case where six liquid fuel outlets (34) are arranged in the gasket (31) at fixed intervals in the circumferential direction, even at the time of the inclination of the combustible gas generator (1), total opening area of three liquid fuel outlets (34) on the inclination lower side is relatively small. Thus, all the necessary liquid fuel (26) cannot be supplied only from the liquid fuel outlets (34) on the inclination lower side but the liquid fuel (26) is also supplied from the liquid fuel outlets (34) on the inclination upper side. Therefore, the distribution of the liquid fuel (26) in the air-fuel mixing chamber (24) becomes more even, and the entire combustible gas generation catalyst (22) can be effectively utilized, so that the generation efficiency of the combustible gas (2) is enhanced.

As shown in FIG. 4(B), in a case where four liquid fuel outlets (34) are arranged in the gasket (31) at fixed intervals in the circumferential direction, even at the time of inclination of the combustible gas generator (1), total opening area of two liquid fuel outlets (34) on the inclination lower side is relatively small. Thus, all the necessary liquid fuel (26) cannot be supplied only from the liquid fuel outlets (34) on the inclination lower side but the liquid fuel (26) is also supplied from the liquid fuel outlets (34) on the inclination upper side. Therefore, the distribution of the liquid fuel (26) in the air-fuel mixing chamber (24) becomes more even, and the entire combustible gas generation catalyst (22) can be effectively utilized, so that the generation efficiency of the combustible gas (2) is more enhanced.

As shown in FIGS. 7(A) and 7(B), a U tube (42) is provided in the middle of an air supply passage (41). As shown in FIG. 7(A), when the combustible gas (2) is not generated in the combustible gas generator (1), contaminants (43) such as remaining fuel flowing into the air supply passage (41) from the combustible gas generator (1) are accumulated in the U tube (42) by the pulsation of the exhaust (6). As shown in FIG. 7(B), when generation of the combustible gas (2) is restarted in the combustible gas generator (1), the contaminants (43) accumulated in the U tube (42) can be purged toward the combustible gas generator (1) by the air (25) supplied from an air supply source (44). Thereby, the contaminants (43) can be prevented from coming into the air supply source (44) and an electromagnetic valve (45) for supplying the air shown in FIG. 2.

Figure 8:
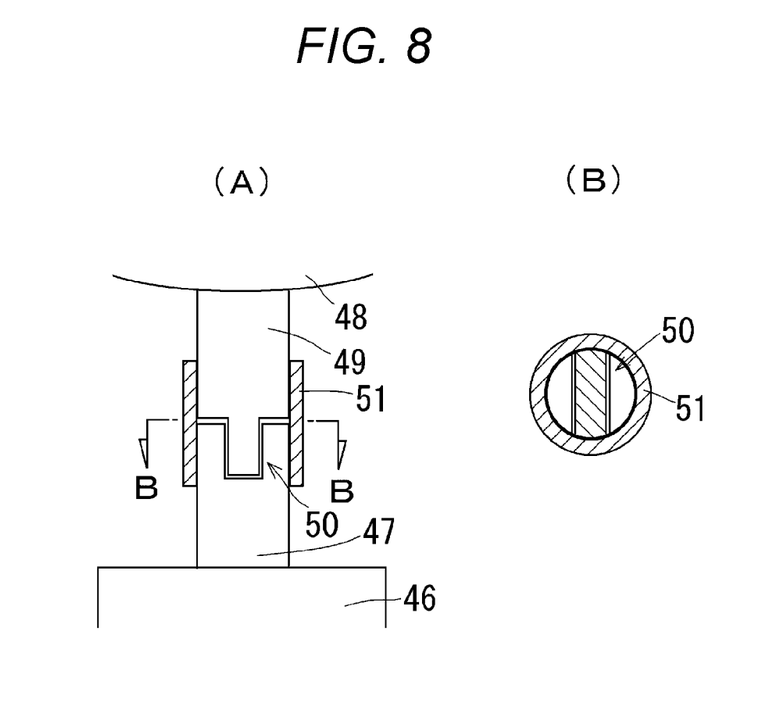
FIG. 8(A) is a front view.
FIG. 8(B) is a sectional view by line B-B of FIG. 1(A)

As shown in FIG. 8, upon connecting an output shaft (47) of a motor (46) and an input shaft (49) of a blower (48) by an Oldham coupling (50), the output shaft (47) of the motor (46) and the input shaft (49) of the blower (48) are coupled by a rubber pipe (51) and grease is injected in the rubber pipe (51). Thereby, impact due to looseness of the Oldham coupling can be absorbed by the rubber pipe (51) and scatter of the grease can be prevented.

Control of the DPF regeneration will be performed as follows.

An engine ECU (61) shown in FIG. 2 is provided with a PM accumulation amount estimate unit (62) and a PM regeneration control unit (63). The engine ECU is an abbreviation of an engine electronic control unit.

The PM accumulation amount estimate unit (62) is a predetermined calculation unit of the engine ECU (61), and estimates a PM accumulation amount from preliminarily and experimentally determined map data based on an engine load, the engine rotation number, a detection exhaust temperature by a DPF upstream side exhaust temperature sensor (64), an exhaust pressure on a upstream side of the DPF (7) by a DPF upstream side exhaust pressure sensor (65), a differential pressure between the upstream and the downstream of the DPF (7) by a differential pressure sensor (66), and the like.

When a PM accumulation amount estimate value by the PM accumulation amount estimate unit (62) reaches a predetermined regeneration start value, the PM regeneration control unit (63) lets a heater (67) generate heat, and drives a liquid fuel pump (68) and the motor (46) of the blower (48). Thereby, the liquid fuel (26) and the air (25) are supplied to the air-fuel mixing chamber (24), so that the combustible gas (2) is generated in the combustible gas generation catalyst (22). The heater (67) is surrounded by a startup catalyst (71) capable of holding the liquid fuel, and the heat of the heater (67) is supplied to the liquid fuel held by the startup catalyst (71) in a focused manner, so that the generation of the combustible gas (2) is promptly started.

At the beginning of starting the generation of the combustible gas (2), the heater (67) generates heat for a predetermined time. However, once the generation of the combustible gas (2) is started, the temperature of the combustible gas generation catalyst (22) is increased by an exothermic reaction. Thus, in a case where a predetermined time elapses after the generation of the combustible gas (2) is started, heat generation of the heater (67) is stopped by a timer.

A temperature sensor (68) of the combustible gas generation catalyst (22) and an inlet side temperature sensor (69) of the combustion catalyst (5) are interlocked with the PM regeneration control unit (63). In a case where the temperature of the combustible gas generation catalyst (22) and an inlet side temperature of the combustion catalyst (5) are lower than predetermined temperatures, the ignition unit (10) ignites the combustible gas (2).

An outlet side temperature sensor (70) of the DPF (7) is interlocked with the PM regeneration control unit (63). In a case where an outlet side temperature of the DPF (7) is abnormally high, the regeneration is urgently canceled.

A flow of the DPF regeneration is as follows.

Figure 9:
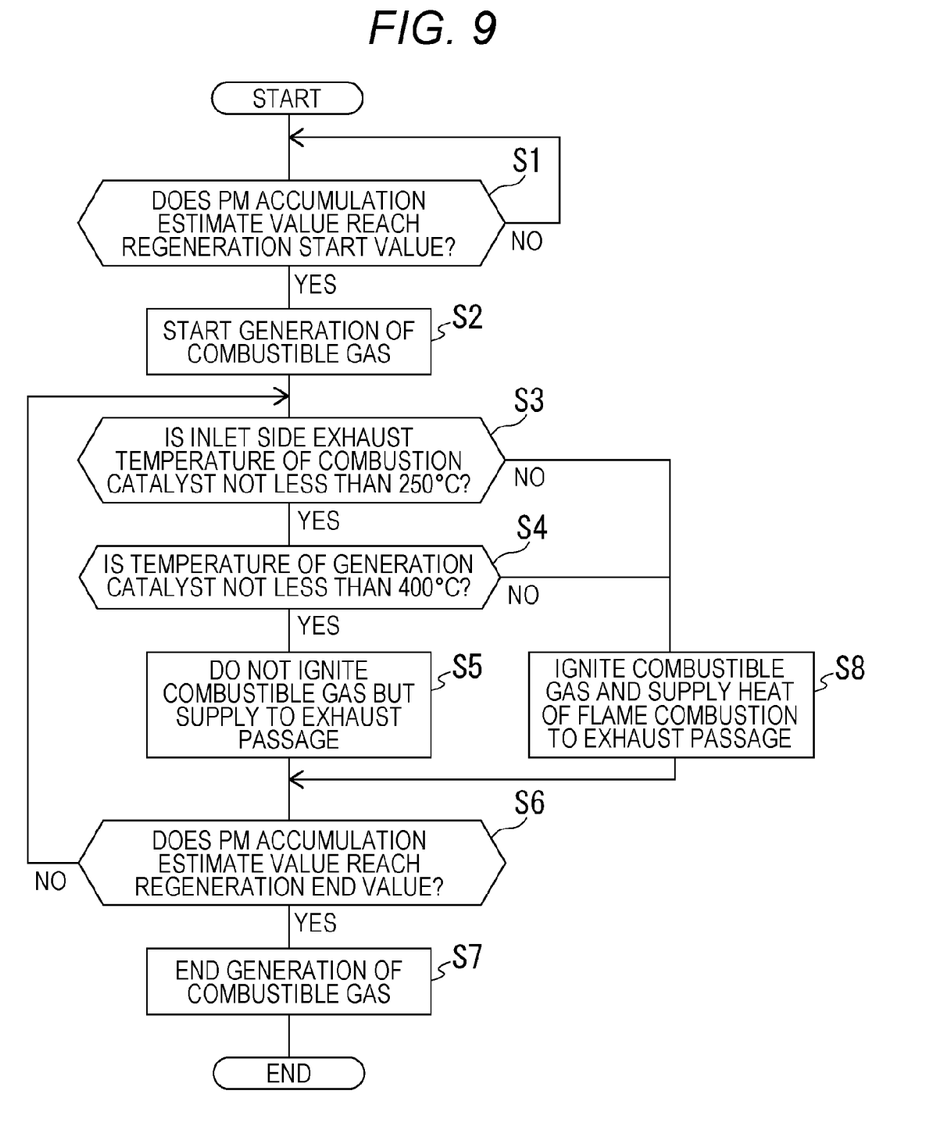
FIG. 9 is a flowchart of DPF regeneration with the exhaust treatment device of FIGS. 1(A) to 1(C).

As shown in FIG. 9, it is determined whether or not a PM accumulation estimate value reaches the regeneration start value in Step (S1). When the determination is YES, the generation of the combustible gas is started in Step (S2), and it is determined whether or not the inlet side exhaust temperature of the combustion catalyst (5) is not less than 250° C. in Step (S3). In a case where the determination is YES, it is determined whether or not the temperature of the combustible gas generation catalyst (22) is not less than 400° C. in Step (S4). In a case where the determination is YES, the combustible gas (2) is not ignited but the combustible gas (2) is supplied to the exhaust passage (4) in Step (S5), and it is determined whether or not the PM accumulation estimate value reaches a regeneration end value in Step (S6). In a case where the determination is YES, the generation of the combustible gas is ended in Step (S7), so that the DPF regeneration is finished.

In a case where the determination in Step (S6) is NO, the flow is returned to Step (S3). In a case where the determination in any of Step (S3) and Step (S4) is NO, the combustible gas (2) is ignited in Step (S8), so that the heat of the flame combustion is supplied to the exhaust passage (4).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An engine exhaust treatment device for generating a combustible gas, the device comprising;
   a combustible gas generator;
   a combustible gas emission port for emitting the combustible gas to an exhaust passage;
   a combustion catalyst for catalyst-combusting the combustible gas; and
   a diesel particulate filter arranged on a downstream side of the combustion catalyst,
   wherein a temperature of an exhaust increases by heat of the catalyst combustion of the combustion catalyst, particulate matter accumulated in the diesel particulate filter are combusted and removed, a combustible gas supply passage communicates with the exhaust passage on an upstream side of the combustion catalyst, and an air supply unit and an ignition unit are provided in the combustible gas supply passage, the air supply unit and the ignition unit being interlocked with a control unit, such that in a case where the temperature of the exhaust is lower than a predetermined temperature, the control unit supplies air to the combustible gas by the air supply unit and causes ignition of the combustible gas by the ignition unit, so as to cause flame combustion of the combustible gas, and such that the temperature of the exhaust in the exhaust passage is increased by heat of the flame combustion, and
   wherein a mixing chamber for mixing the combustible gas and the air is formed along the combustible gas supply passage on an upstream of the ignition unit, a combustible gas nozzle and an air supply tube being provided in the mixing chamber, the combustible gas nozzle being arranged in a center part of the mixing chamber along a forming direction of the mixing chamber, a plurality of combustible gas outlets being formed on a circumferential surface of the combustible gas nozzle, the air supply tube being arranged in an inner circumferential surface part of the mixing chamber along a circumferential direction of an inner circumferential surface of the mixing chamber, the air supplied from the air supply tube being whirled around the combustible gas nozzle along the inner circumferential surface of the mixing chamber, and the combustible gas supplied in a radial direction of the mixing chamber from the combustible gas outlets being mixed with the whirled air.

2. The engine exhaust treatment device according to claim 1, wherein the exhaust passage and the combustible gas supply passage are provided side by side, a heat emission port is formed on a border between the exhaust passage and the combustible gas supply passage on a downstream side of the combustible gas supply passage, the heat emission port provides communication between the exhaust passage and the combustible gas supply passage, and the ignition unit arranged on the downstream side of the combustible gas supply passage faces the heat emission port.

3. The engine exhaust treatment device according to claim 2, wherein the combustible gas supply passage is provided side by side on a lower side of the exhaust passage, and the heat emission port is formed on a lower side of a circumferential surface of the exhaust passage.

4. An engine exhaust treatment device for generating a combustible gas, the device comprising:
   a combustible gas generator;
   a combustible gas emission port for emitting the combustible gas to an exhaust passage;
   a combustion catalyst for catalyst-combusting the combustible gas; and
   an exhaust purification catalyst arranged on a downstream side of the combustion catalyst,
   wherein a temperature of an exhaust increases by heat of the catalyst combustion of the combustion catalyst, the exhaust purification catalyst is activated, a combustible gas supply passage communicates with the exhaust passage on an upstream side of the combustion catalyst, and an air supply unit and an ignition unit are provided in the combustible gas supply passage, the air supply unit and the ignition unit being interlocked with a control unit, such that in a case where the temperature of the exhaust is lower than a predetermined temperature, the control unit supplies air to the combustible gas by the air supply unit and causes ignition of the combustible gas by the ignition unit, so as to cause flame combustion of the combustible gas, and such that the temperature of the exhaust in the exhaust passage is increased by heat of the flame combustion, and
   wherein a mixing chamber for mixing the combustible gas and the air is formed along the combustible gas supply passage on an upstream of the ignition unit, a combustible gas nozzle and an air supply tube being provided in the mixing chamber, the combustible gas nozzle being arranged in a center part of the mixing chamber along a forming direction of the mixing chamber, a plurality of combustible gas outlets being formed on a circumferential surface of the combustible gas nozzle, the air supply tube being arranged in an inner circumferential surface part of the mixing chamber along a circumferential direction of an inner circumferential surface of the mixing chamber, the air supplied from the air supply tube being whirled around the combustible gas nozzle along the inner circumferential surface of the mixing chamber, and the combustible gas supplied in a radial direction of the mixing chamber from the combustible gas outlets being mixed with the whirled air.

5. The engine exhaust treatment device according to claim 4, wherein the exhaust passage and the combustible gas supply passage are provided side by side, a heat emission port is formed on a border between the exhaust passage and the combustible gas supply passage on a downstream side of the combustible gas supply passage, the heat emission port provides communication between the exhaust passage and the combustible gas supply passage, and the ignition unit arranged on the downstream side of the combustible gas supply passage faces the heat emission port.

6. The engine exhaust treatment device according to claim 5, wherein the combustible gas supply passage is provided side by side on a lower side of the exhaust passage, and the heat emission port is formed on a lower side of a circumferential surface of the exhaust passage.

* * * * *